(12) United States Patent
Ward

(10) Patent No.: US 7,507,316 B2
(45) Date of Patent: Mar. 24, 2009

(54) SOLAR STILL

(76) Inventor: John Ward, 92 Hall Street, Semaphore, South Australia (AU) 5019

( * ) Notice: Subject to any disclaimer, the term of this patent is extended or adjusted under 35 U.S.C. 154(b) by 590 days.

(21) Appl. No.: 10/403,030

(22) Filed: Apr. 1, 2003

(65) Prior Publication Data

US 2004/0195083 A1 Oct. 7, 2004

Related U.S. Application Data

(63) Continuation-in-part of application No. 10/391,194, filed on Mar. 19, 2003, now abandoned.

(51) Int. Cl.
*B01D 3/02* (2006.01)
*C02F 1/14* (2006.01)
(52) U.S. Cl. .................. 202/234; 159/903; 202/184; 202/238; 202/266; 203/10; 203/DIG. 1
(58) Field of Classification Search ............... 159/903, 159/DIG. 15, DIG. 42; 202/183, 184, 234, 202/236, 238, 266, 267.1, 269; 203/10, 89, 203/DIG. 1

See application file for complete search history.

(56) References Cited

U.S. PATENT DOCUMENTS

| | | | | |
|---|---|---|---|---|
| 3,655,517 A * | 4/1972 | Hensley et al. | ............... | 202/234 |
| 4,141,798 A * | 2/1979 | Grosse | ................. | 202/234 |
| 4,308,858 A * | 1/1982 | Skillman | ................ | 126/570 |
| 4,333,448 A * | 6/1982 | Johnson | ................ | 126/714 |
| 4,345,587 A * | 8/1982 | Carvalho | ............... | 126/662 |
| 4,420,375 A * | 12/1983 | Husson | .................. | 202/234 |
| 5,628,879 A * | 5/1997 | Woodruff | .............. | 202/234 |
| 6,440,275 B1 * | 8/2002 | Domen | .................. | 202/234 |
| 6,619,511 B2 * | 9/2003 | Hydak et al. | ............. | 222/185.1 |
| 6,663,750 B1 * | 12/2003 | Coon | ..................... | 202/234 |
| 6,821,395 B1 * | 11/2004 | Ward | ..................... | 203/10 |

* cited by examiner

*Primary Examiner*—Virginia Manoharan
(74) *Attorney, Agent, or Firm*—Crowell & Moring LLP

(57) ABSTRACT

The solar still has a frame, an evaporator within the frame and a glass sheet supported by the frame and spaced above the evaporator. The evaporator has a peripheral flange in contact with the edge of the glass sheet. The glass sheet and peripheral flange are nested within an inwardly facing channel on the frame, the sealing between the glass and the flange being by surface tension of water between the glass and the flange.

11 Claims, 6 Drawing Sheets

SOLAR STILL

CROSS REFERENCE TO RELATED APPLICATION

The present invention is a continuation-in-part of U.S. patent application Ser. No. 10/391,194, filed Mar. 19, 2003.

FIELD OF THE INVENTION

This invention relates to an improved solar still, more particularly to a solar still for producing drinkable or potable water.

BACKGROUND TO THE INVENTION

Solar stills are well known, an example being the U.S. Pat. No. 753,643 in the name of the inventor directed to a solar still including a number of cells, each having a dome to minimise or prevent distortion thus eliminating stresses produced by the changing temperature conditions during the exposure of the still to the hot daytime temperatures and the much cooler, even temperatures approaching freezing during the night time.

This solar still is very effective and can produce large volumes of distilled water.

Solar stills are constructed so that there must be an effective seal between the glass sheet and the frame of the still. This is to ensure that not only the condensed water does not escape, but also that air does not enter the interior of the still and thus severely reduce the efficiency or even the operation of the still.

Up to date as far is known, the glass sheet is sealed to the frame or body of the still by a sealing member provided between the sheet of glass and the frame, this is often a rubber or neoprene or rubber like material, either in the form of a rubber ring or specially moulded and produced seal into which the glass sheet is inserted and clamping pressure applied to seal against the glass sheet, usually by the provision of a sealing member such as rubber, caulk, neoprene silicone etc. This clamping pressure is usually applied by a circumferential member having a flange overlying the edge of the glass, the member being screwed down to apply the pressure to seal the perimeter of the glass sheet. In this way the water produced can be in contact with the sealant and contamination of the water could result.

Solar stills to produce potable water are required in many countries where clean pure uncontaminated water is unavailable and it is an object of this invention to produce solar stills which are easily assembled with a minimum of tools.

Also it is an object of the invention to produce a solar still which requires minimum or no maintenance during the production of virtually pure water.

It is an object of this invention to produce a solar still which is easy to assemble when transported to the point of use.

It is a further object of the invention to provide a solar still which does not require sealing products which can be in contact with the condensed water collected on the under surface of the glass sheet.

BRIEF STATEMENT OF THE INVENTION

There is provided in one form of the invention a water still or purifier of the tilted tray type including a frame supporting an absorber and a glass sheet spaced above said absorber, a support means on the frame, opening inwardly of the frame supporting the peripheral edges of the glass sheet and the absorber sheet with the glass sheet being in contact with a peripheral flange on the absorber, whereby during operation water vapour generated condenses as a thin film of water between the glass sheet and the flange of the absorber with the resultant surface tension of the condensed water pulling the glass sheet against the peripheral flange to form a watertight seal.

Also there is provided according to the invention a solar water still or purifier, the still being of the tilted tray type with the inlet of water being at a higher elevation than the discharge from the purifier, the still including a frame including a base, the base supporting an absorber of a plurality of individual cells whereby water flows from a cell of higher elevation to an adjacent cell of lower elevation, a glass sheet spaced above the absorber, a peripheral flange on the absorber, the frame has an internal support to support the glass sheet and the flange of the absorber in contact with each other, whereby in operation vapour condenses as a thin film between the glass sheet and the flange of the absorber, the resultant surface tension holding the glass sheet and absorber flange in sealing relationship.

Preferably each cell has a dome on its bottom surface to accommodate for thermal stresses between extreme temperature changes.

Preferably the still can be assembled either by the use of screws or by simply clipping the component parts together.

BRIEF DESCRIPTION OF THE INVENTION

In order to more fully describe the invention reference will now be made to the accompanying drawings in which.

DESCRIPTION OF THE PREFERRED EMBODIMENT

Figure 1:
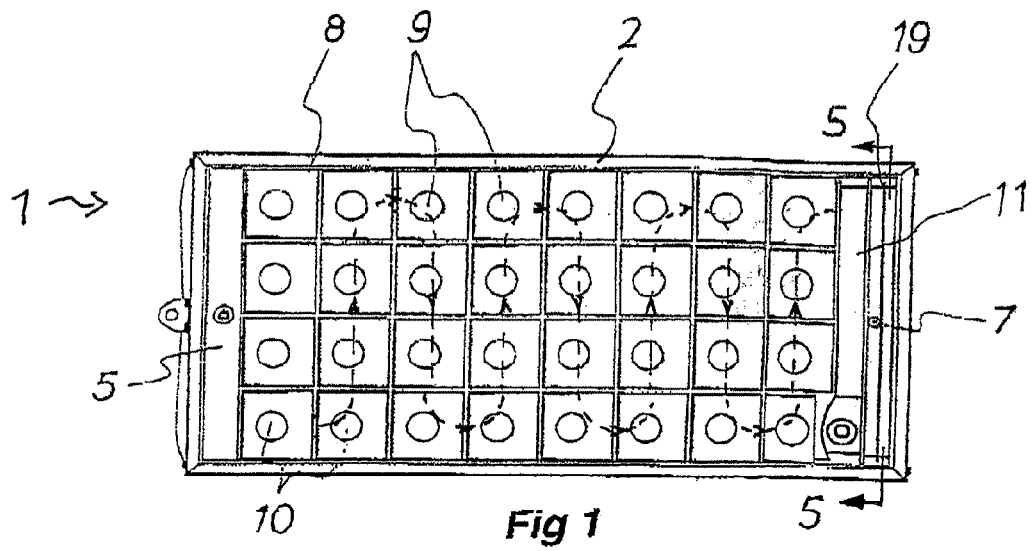
FIG. 1 is a plan view of a solar water purifier.
Figure 2:
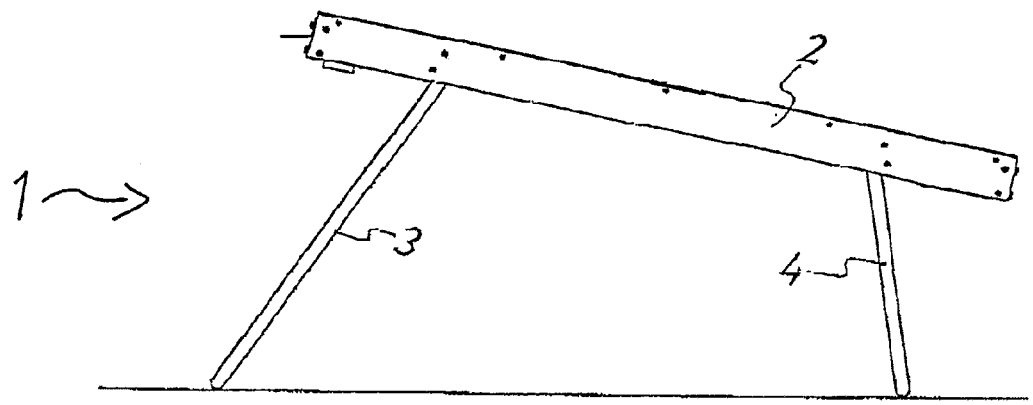
FIG. 2 is a side view.
Figure 3:
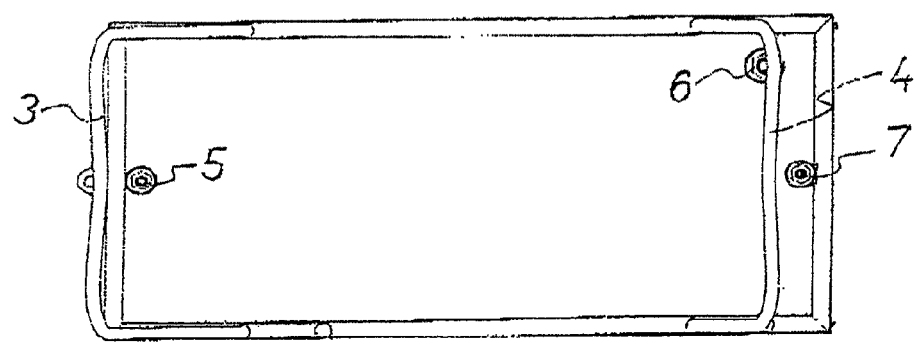
FIG. 3 is an underside view of the legs.
Figure 4:
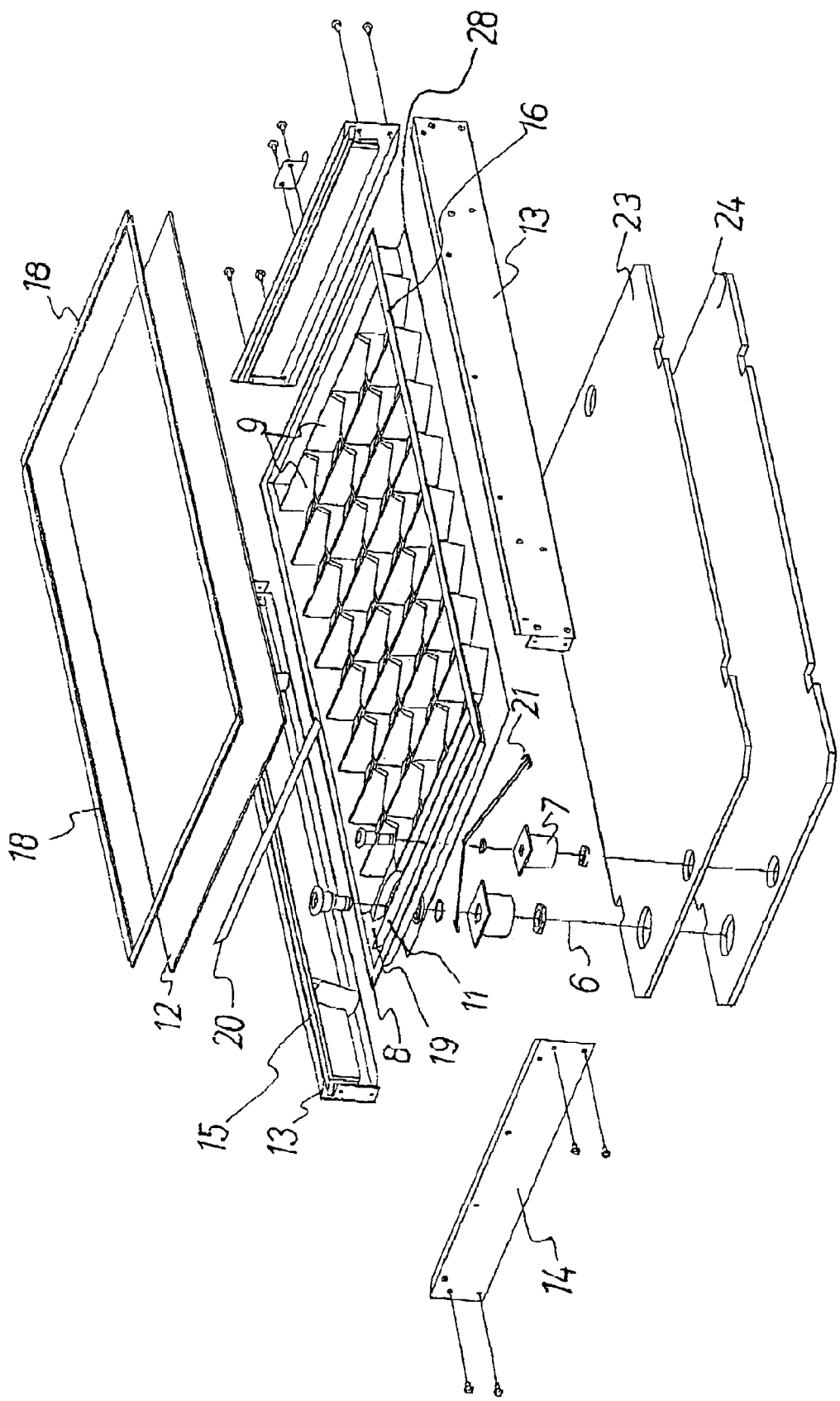
FIG. 4 is an exploded view of the components of the solar absorber.
Figure 5:
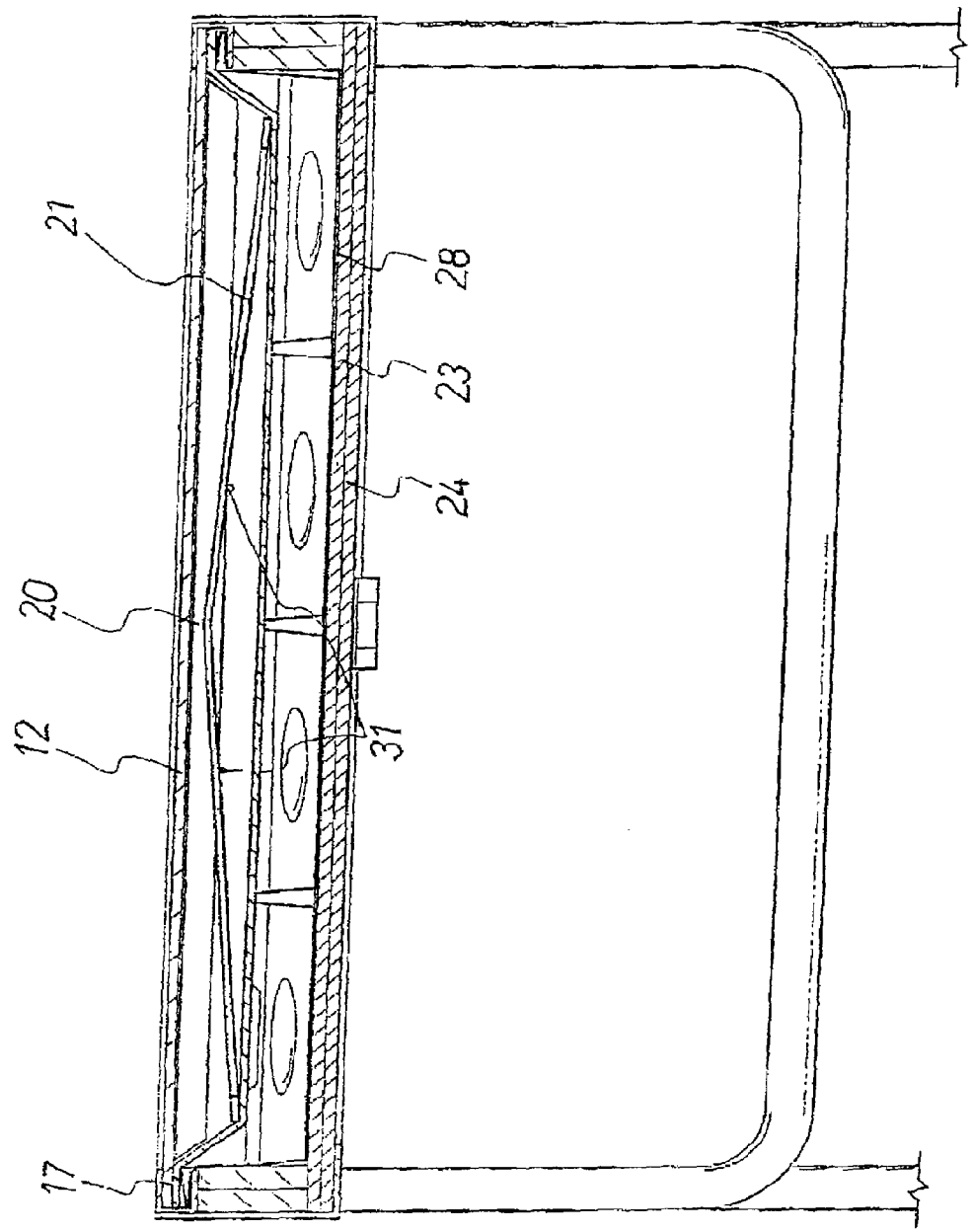
FIG. 5 is a view along the lines 5-5 of FIG. 1.

Referring to the drawings the solar still 1 includes a frame 2 supported in this example on legs 3 and 4, each of different height so that the still is inclined at the desired angle of approximately 12.5 degrees. FIG. 3 shows the inlet 5 for the water to be distilled, and the outlet 6 for the water of higher concentration of contaminants and outlet 7 for the distilled water. The still includes an absorber 8 formed by a number of individual cells 9, each cell having an expansion dome 10. The water from inlet 5 flows slowly over the weirs in a zigzag fashion through all the cells, portion being evaporated and the concentrated water passes into residue collection channel 11, either to be passed through a further still, or passed to waste. The distilled water collected on the glass 12 of the still is collected in collection channel 19 to pass through outlet 7 to be collected.

Figure 6:
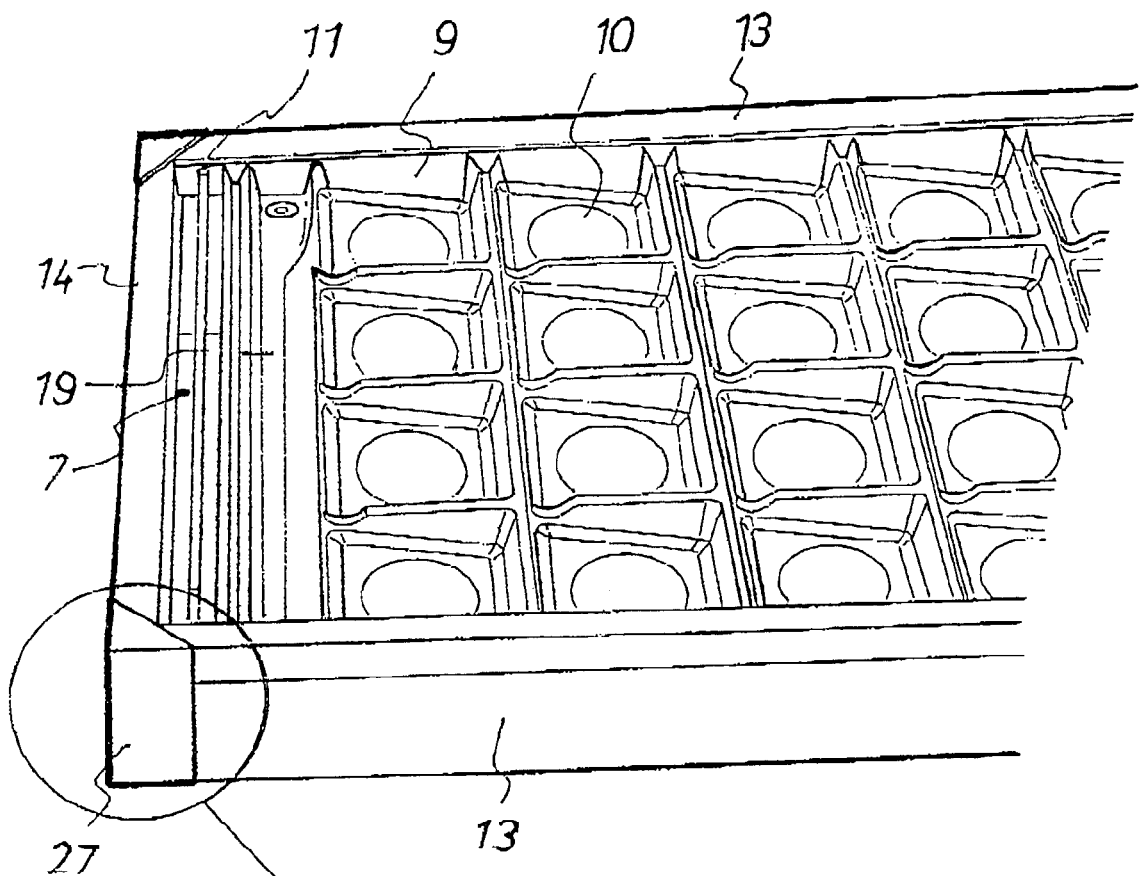
FIGS. 6 and 6(*a*) show portion of the absorber.
Figure 6A:
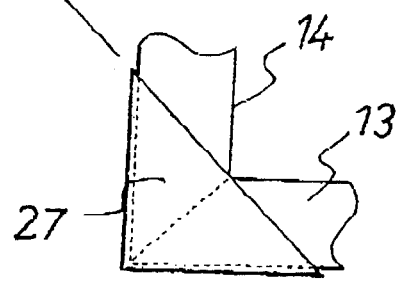
Figure 7:
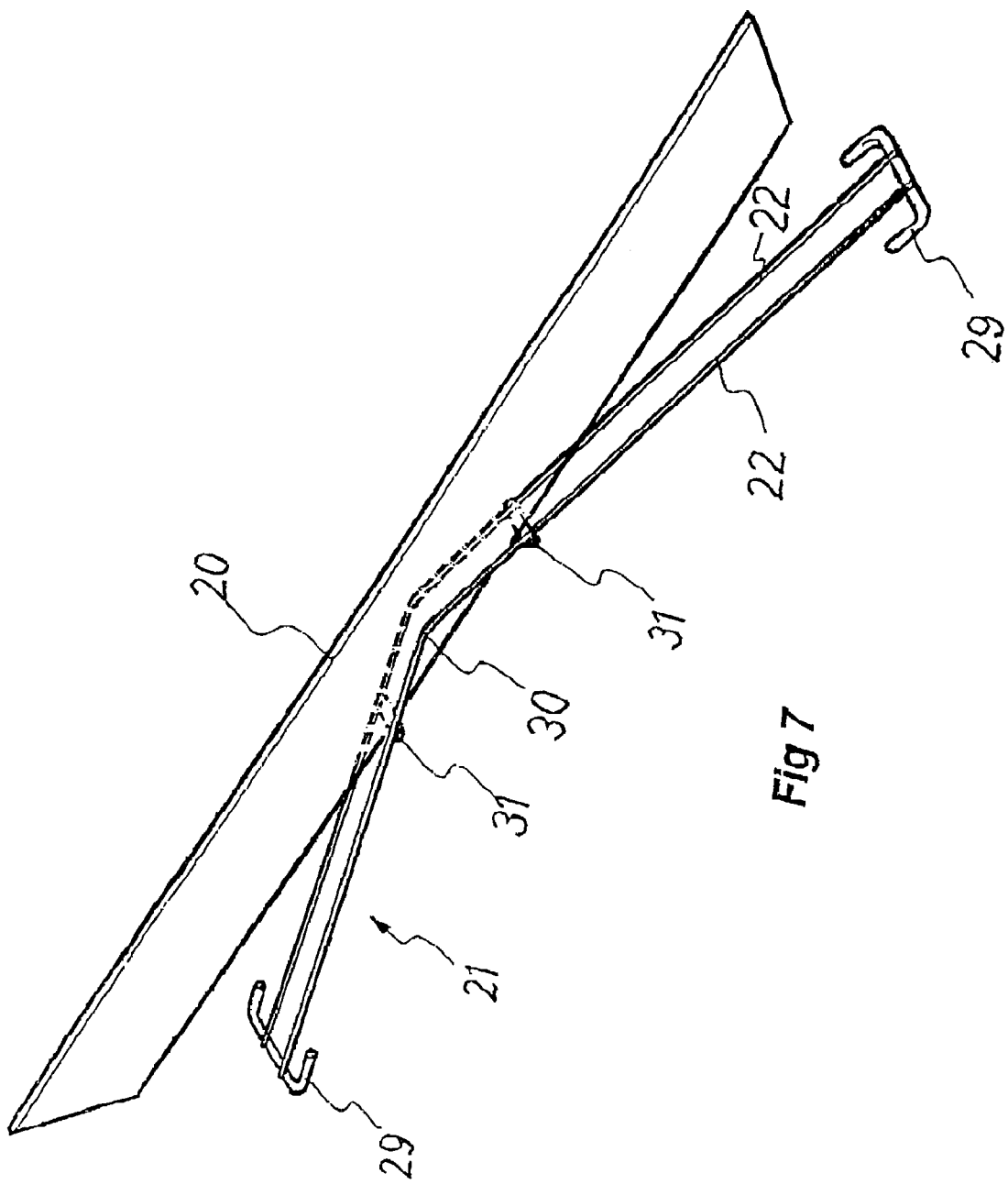
FIG. 7 shows the wiper to direct the condensate to the collection channel.
Figure 8:
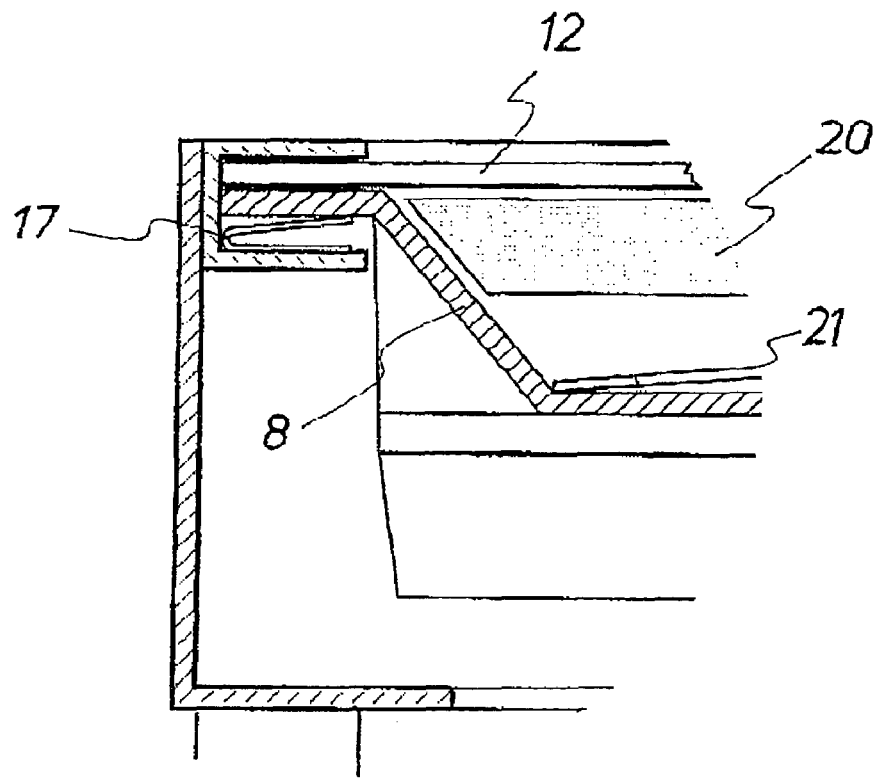
FIG. 8 shows a portion of the corner of the still.

The frame 2 includes frame sides 13 and end frames 14 each of which are of channel section and also include on the inner wall of each frame section a small channel section 15 is attached by rivets, alternately a single extruded section can be used. The frame sections can be riveted together or joined by corner pieces 27 as shown in FIGS. 6 and 6(*a*). The absorber has a peripheral flange 16 supported by the channel section 15 on a wave spring 17.

The edge of the glass 12 rests on the peripheral flange and is located in the channel section 15, a glass retainer strip 18 of a suitable plastics material positioned between the top edge of the glass and the under side of the top flange of the channel section 15.

The glass sheet 12 is spaced above the absorber 8, and a peripheral flange 16 is disposed on the absorber 8, so that the glass sheet 12 and the peripheral flange 16 are in contact with each other in an unsealed relationship prior to operation. During operation, a watertight seal is formed between the glass sheet 12 and the peripheral flange 16, due to the condensation of water vapor generated during operation as a thin film between the glass sheet and the flange of the absorber, the resultant surface tension holding the glass sheet 12 and absorber flange 16 in the sealing relationship.

To assemble the still, three sides of the frame are assembled and wave spring 17, absorber 8, glass and the glass retainer are positioned in the channel section 15, and the final side of the frame is then assembled thus locking all the components in the frame.

In the distilled water collection channel 19 a wiper blade 20 is resiliently held against the under surface of the glass whereby the condensate moving down the underside of the glass is deflected into the collection channel 19. The blade can be of a suitable plastic material and the spring 21 is ideally made of stainless steel, the spring having a slot 22 across the upper portion of the spring in which the blade is positioned.

The frame of the still also encloses sheets of thermally insulating cardboard 23 and corflute 24 to complete the base of the still, the respective outlets and the inlet passing through the sheets.

Figure 9:
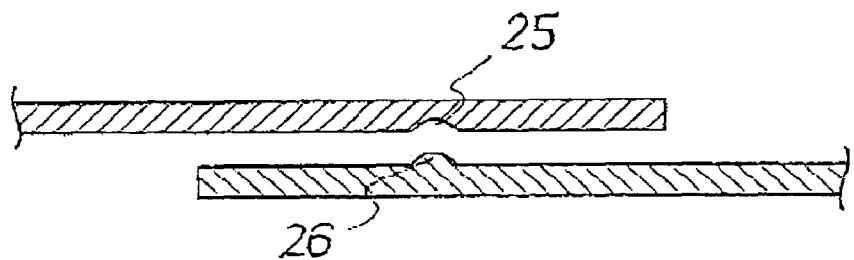
FIG. 9 shows the clipping the component parts together.

The above embodiment shows the frame being assembled by screws or rivets. However as shown in FIG. 9 the frame sides can be clipped together, one portion having a longitudinal recess 25 and the co-operating portion having a longitudinal ridge or node 26. In this way the parts can be clipped together without the requirement of screws or rivets.

There is a continuous supply of water flowing through the absorber, the flow being sufficient that there is a minimum overflow into the waste collection channel. This overflow of water continually removes and flushes the contaminants and any solids in the feed water, so that the cells and absorber plate only need infrequent cleaning, if at all.

During operation the water vapour and air mixture endeavours to escape via the small circumferential space between the underside of the glass surface and the uppermost surface of the plastic, stainless steel or titanium absorber plate. In transit the water vapour condenses into water and the surface tension of the resultant thin film pulling with considerable force the glass window to the absorber plate. Thereby immediately sealing the two components together in a leak free fashion. No seal other than the water being processed is required.

Thus any undesirable taste and smell normally transmitted to the water when using common sealants such as rubber, caulk, silicone is not acquired.

Hence the still is easy to assemble, and by designing the extrusions forming the frame and assembling the still there is no need to ensure any sealing members are correctly positioned and clamped into sealing arrangement. In the present invention the glass sheet is assembled into direct contact with the flange of the absorber, and the sealing is achieved by the surface tension of the condensed vapour in the small space between the glass and the absorber. Due to the fact the seal is formed by the condensed vapour, the seal is pure and free from contaminants, bacteria and the like. The water seal is also renewed each time after a period of operation.

The glass sheet is preferably of toughened white glass with a very low content of ferrous and ferric oxide. Such glass transmits well radiation in the ultra-violet (0.35 to 0.40 microns) the visible spectrum (0.40 to 0.70 microns) and the near infra red region from about 0.70 to 1.5 microns. The infrared radiation heats the liquid, the ultra violet radiation kills most of the common bacteria. The two wavelength regions in combination produce a pure germ free water vapour which condenses onto the underside of the glass and is later collected. The bacteria cannot cross a vapour path and consequently remain in the cell to be sterilised, die and are then flushed away by the flow through water.

It has been noted the solar still of the present invention has an output greatly in excess of the output of known stills and above what is calculated to be the output of a conventional still per square meter. Research has established that in the still above, each cell acts as a heat pipe between the surface of the water and the under surface of the glass. The kinetic energy of the water vapour molecules on the glass cannot return to its source, and to conserve energy the individual droplets coalesce forming a sheet of water which runs down the underside of the glass window into the collection channel. The sheeting effect can only occur if the system is considered to be an array of square section short length heat pipes. The theory that each individual cell acts as a heat pipe is generally verified by the glass sheet becoming very hot, virtually too hot to touch. Partial confirmation of this effect has been confirmed by cooling the top surface of the glass sheet with a consequent cessation of the whole process.

Thus it can be seen there is provided by this invention a solar still to purify water. The feed water can be water from a stream, water from mining industries, contaminated ground water, radio active water or sea water. The stills can be arranged in parallel or in series, with the waste water from one still fed to the next still as feed water for that still The stills as noted above can be easy to assemble, such as by being clipped together, the still having the unique sealing between the glass sheet and the edge of the absorber or absorber plate.

Although alternate forms of the invention have been described in some detail it is to be realised the invention is not to be limited thereto but can include modifications and variations falling within the spirit and scope of the invention defined by the appended claims.

The invention claimed is:

1. A tilted tray solar still or purifier for purifying water through a process of evaporation and condensation, including a frame supporting an absorber and a glass sheet spaced above said absorber, and a support means on the frame for forming a watertight seal between the glass sheet and a peripheral flange on the absorber during operation, the support means opening inwardly of the frame supporting the peripheral edges of the glass sheet and the absorber sheet with the glass sheet being in contact with the peripheral flange on the absorber in an unsealed relationship, wherein the support means is arranged such that water vapor generated during operation condenses as a thin film between the glass sheet and the peripheral flange of the absorber with the resultant surface tension of the condensed water pulling the glass sheet against the peripheral flange to form the watertight seal, and wherein the support means comprises an inwardly facing channel member on the frame, the peripheral flange of the absorber and the edge of the glass nesting in the channel member, and the channel member is dimensioned and arranged such that the peripheral flange and edge of the glass sheet are in contact with each other, a glass retainer made of plastic positioned between the upper edge of the glass sheet and the under surface of the top flange of the channel member.

2. A tilted tray solar still or purifier, the still having an inlet of water being at a higher elevation than a discharge from the purifier, the still including a frame including a base, the base supporting an absorber of a plurality of individual cells arranged to facilitate water flow from a cell of higher elevation to an adjacent cell of lower elevation, a glass sheet spaced above the absorber, and a peripheral flange on the absorber, the frame having an internal support means for supporting the glass sheet and the peripheral flange of the absorber in contact with each other in an unsealed relationship prior to operation and for forming a watertight seal between the glass sheet and peripheral flange during operation, the internal support means facilitating the condensation of water vapor generated during operation as a thin film between the glass sheet and the flange of the absorber, the resultant surface tension holding the glass sheet and absorber flange in the sealing relationship, wherein the internal support means comprises an inwardly facing channel member on the frame, the peripheral flange of the absorber and the edge of the glass nesting in the channel member, and the channel member is dimensioned and arranged such that the peripheral flange and edge of the glass sheet are in contact with each other, a glass retainer made of plastic positioned between the upper edge of the glass sheet and the under surface of the top flange of the channel member.

3. A solar still as defined in claim 2 further comprising a resilient member positioned between an upper surface of a lower flange of the channel member and the under surface of the peripheral flange of the absorber.

4. A solar still as defined in claim 2, wherein the frame further includes side members and end members joined at the respective corners by screws or rivets.

5. A solar still as defined in claim 4 wherein each cell has an upwardly extending dome on the cell's bottom surface to accommodate for thermal stresses during temperature changes.

6. A solar still as defined in claim 4 wherein the side and end members further comprise co-operating ribs and recesses for clipping together the frame.

7. A solar still as defined in claim 6 wherein each cell has an upwardly extending dome on the cell's bottom surface to accommodate for thermal stresses during temperature changes.

8. A solar still as defined in claim 2, wherein each cell further comprises an upwardly extending dome on the bottom surface to accommodate for thermal stresses during temperature changes.

9. A solar still as defined in claim 2, wherein the channel member is attached to the frame.

10. A solar still as defined in claim 2, wherein members of the frame are extruded and contain the channel member.

11. A solar tilted tray water still or purifier, with an inlet of water being at a higher elevation than a discharge from the purifier, the still including a frame including a base, the base supporting an absorber including a plurality of individual cells arranged to facilitate water flow from a cell of higher elevation to an adjacent cell of lower elevation, a glass sheet spaced above the absorber and positioned in contact with a peripheral flange on the absorber in an unsealed relationship prior to operation, and sealing means for forming a watertight seal between the glass sheet and the peripheral flange during operation, such that in operation there is obtained an array of short length heat pipes wherein water molecules on the glass coalesce to form a sheet of water on the under surface of the glass, and wherein water condenses as a thin film between the glass sheet and the peripheral flange of the absorber with the resultant surface tension of the condensed water pulling the glass sheet against the peripheral flange to form the watertight seal, wherein the frame has internal support means comprising an inwardly facing channel member on the frame, the peripheral flange of the absorber and an edge of the glass sheet nesting in the channel member, and the channel member is dimensioned and arranged such that the peripheral flange and edge of the glass sheet are in contact with each other, a glass retainer made of plastic being positioned between the upper edge of the glass sheet and the under surface of the top flange of the channel member.

\* \* \* \* \*